Patented Mar. 27, 1923.

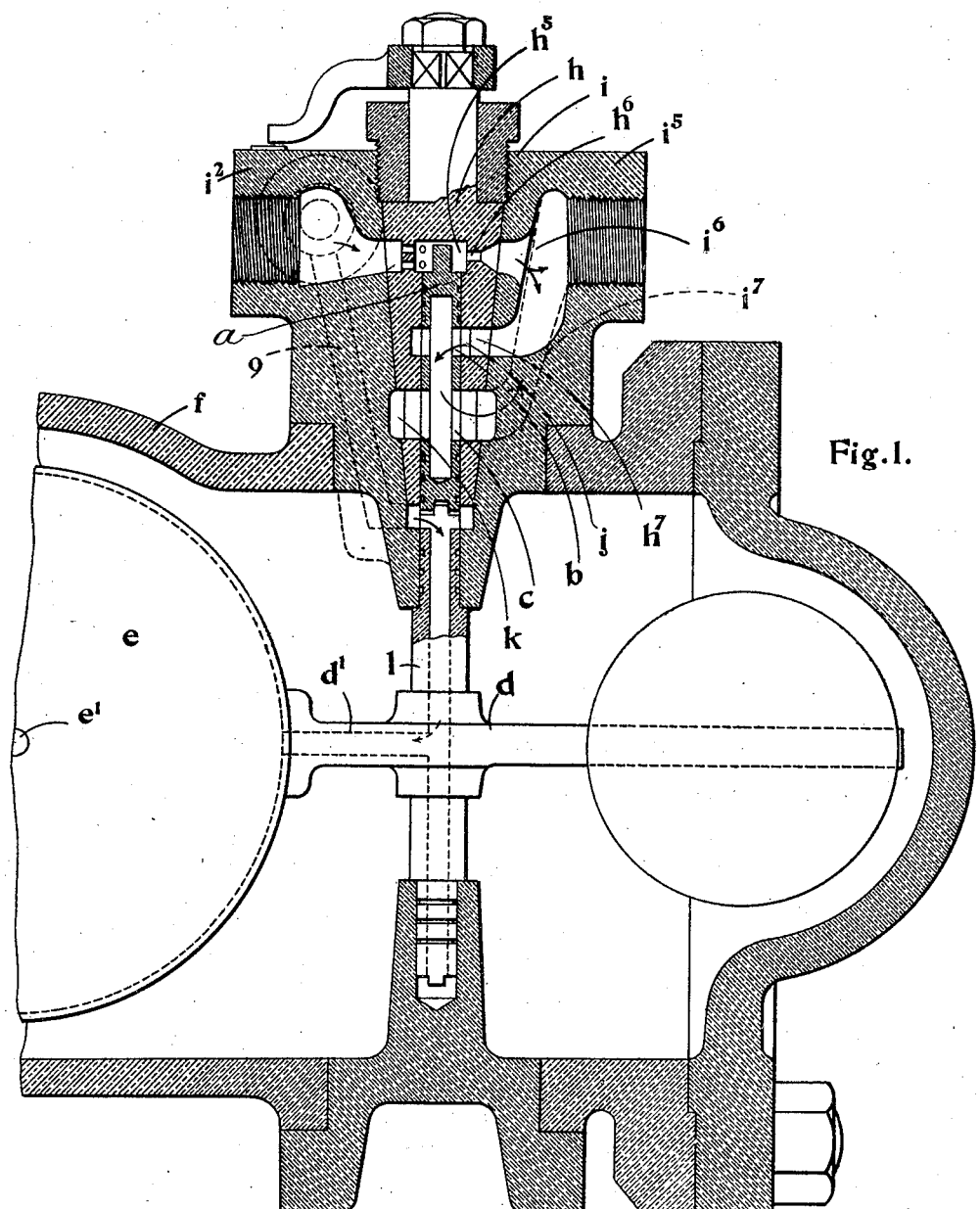

1,449,906

UNITED STATES PATENT OFFICE.

WILLIAM HENRY LOVETT AND ALBERT EDWIN DOBBS, OF WALTON-ON-THE-NAZE, ENGLAND.

FEED-WATER REGULATOR.

Application filed May 11, 1922. Serial No. 560,245.

*To all whom it may concern:*

Be it known that we, WILLIAM HENRY LOVETT and ALBERT EDWIN DOBBS, subjects of the King of Great Britain and Ireland, residing, respectively, at Sandycot, Walton-on-the-Naze, Essex, England, and 2 Portobello Road, Walton-on-the-Naze, Essex, England, have invented certain new and useful Improvements Relating to Feed-Water Regulators, of which the following is a specification.

This invention relates to feed water regulators of the type in which a float operated valve is employed to control the movement of a balancing piston which in turn controls the boiler feed check valve, and the invention more especially relates to the construction of feed water regulator the subject-matter of a co-pending application.

According to the invention the float is provided as a hollow body charged with liquid, the top of the float being provided with a small hole to prevent the collapsing of the float when made of thin metal. The float is advantageously formed of a spherical shape and is supplied with fluid through a duct formed in the float lever and through a communicating duct in the float spindle.

According to the invention a regulating nozzle is provided on the plug carrying the hollow cylindrical float operated valve and thus the plug carrying the nozzle and the hollow cylindrical valve may be withdrawn from the housing without disturbing the pipe connections or the float.

According to the invention the nozzle is in constant communication with the ports which convey the operating fluid to and from the nozzle through the housing at any angular position of the carrying plug into which it may be set to vary the water level.

According to the invention moreover the excess pressure fluid from the under side of the feed check valve is used for balancing the hollow cylindrical valve and also for balancing the float spindle so that thus any variation in the excess pressure does not impair the balance of either the valve or the spindle.

The invention comprises the constructional features which are hereinafter described.

The invention is illustrated by way of example in the accompanying drawing in which—

Figure 1 is a sectional plan view of a boiler feed water regulator constructed according to the invention.

Figure 3:
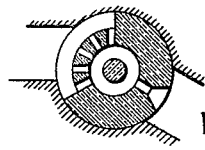
Figure 3 is a transverse section through the valve and carrying plug at the nozzle.
Figure 4:
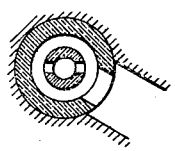
Figure 4 is a transverse section through the valve and carrying plug showing the inlet port.
Figure 5:
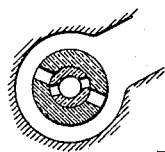
Figure 5 is a transverse section through the valve and carrying plug through the inlet ports showing the valve cutting off.
Figure 2:
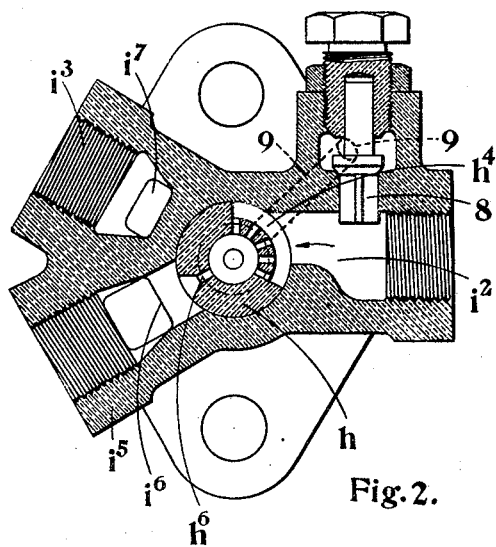
Figure 2 is a transverse sectional elevation through the valve housing.

In carrying the invention into effect in its application to a feed water regulator of the construction described in the said copending application, the feed check valve 1 may be integrally provided with a downwardly protruding stem 2 at the lower end of which a balancing piston 3 is integrally formed capable of sliding within a cylindrical part of the valve casing 4 immediately beneath the check valve seat. On the valve casing 4 immediately between the check valve and the piston, a pipe 7 is connected leading to the valve housing $i$ of the feed water regulator at a position accessible to the nozzle provided in the valve carrying plug $h$ as aforesaid and for this purpose the valve housing $i$ is provided with a boss $i^2$ adapted for the connection of the connecting pipe 7. In this boss $i^2$ a passage is provided leading to a segmental recess $h^4$ formed on the periphery of the valve carrying plug $h$ and this segmental recess $h^4$ communicates through a number of radial holes in the valve carrying plug $h$ with an adjacent central cavity $h^5$ in the plug within which the upper end of the hollow cylindrical valve $a$ extends. From this central cavity $h^5$ in an opposite position to that in which the series of radial holes are provided as aforesaid, a radial hole $h^6$ is disposed which is advantageously provided with an outwardly flaring mouth extending to the adjacent periphery of the valve carrying plug and which communicates with a passage $i^6$ in the housing communicating with the hollow boss $i^5$ to which the pipe 5 is connected, while the passage $i^6$ in the housing communicates at its lower end with a lateral passage or port $h^7$ and an annular passage $j$ formed within the valve carrying plug $h$ at a position corresponding to the inlet ports $b$ provided in the hollow cylindrical valve $a$. An annular outlet space $k$ may be provided partly in the conical cavity in the housing $i$ and partly in an adjacent position upon the periphery of the conical plug $h$ at a position corresponding to the outlet ports $c$ provided on the hollow cylindrical valve $a$, and the annular space last referred to communicates with an outlet passage $i^7$ in the housing $i$ which extends outwardly through an integral boss $i^3$ provided on the housing to which is connected the outlet pipe 6.

Figure 6:
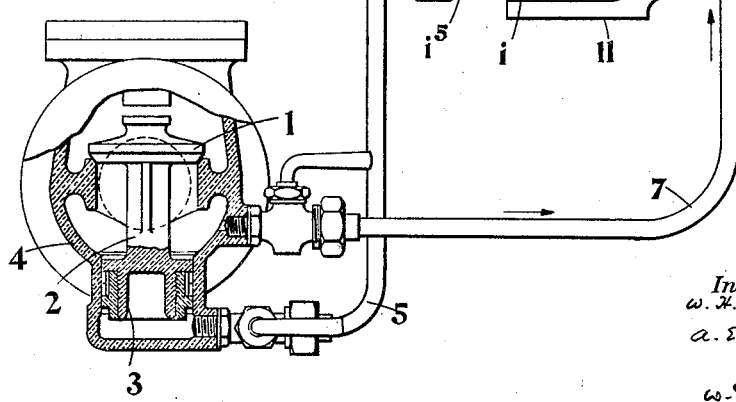
Figure 6 is an elevation on a reduced scale showing the pipe connections between the casing of the regulator and the check valve casing.

In Figure 6, 10 shows the face to which the steam pipe is secured for connection to the boiler; 11 shows the face to which the water pipe is secured for connection with the boiler.

The float casing $f$ is provided of the form and construction as described in the specification of the co-pending application, but the float $e$ is provided hollow and its closed top is provided with a small hole $e^1$ of such a size as to serve to equalize the pressure within and without the float under working conditions. The hole $e^1$ also acts as a vent to ensure that the float is fully charged with liquid. The fluid for charging the float $e$ is led from the casing 4 of the feed check valve through the pipe 7 to the hollow boss $i^2$ of the housing $i$, thence through an adjustable non-return valve 8 mounted within the boss $i^2$ to a downwardly extending duct 9 provided as in construction of the co-pending application and thence through the hollow float spindle $l$ which is provided with an axial hole and thence through the duct $d^1$ in the float lever $d$ which discharges in a central position into the hollow float $e$. The liquid enters the float horizontally and thus no disturbance is set up by the velocity of entry. The liquid may pass from end to end of the float spindle so that thus both ends of the float spindle may be subjected to the same pressure as in the construction of the prior application and as in the construction of the prior application the pressure fluid is accessible to both ends of the hollow cylindrical valve, both the valve and the float spindle being balanced axially.

It will be understood that the fluid passing through the float spindle and float lever is heated before entering the float by reason of the prevailing temperature of the float casing and the fluid therein. The fluid is prevented from escaping to the float casing from over either end of the float spindle by providing the respective ends of the spindle of reduced diameter with annular grooves thereon with a view to ensuring a tight joint.

It will be understood that part of the supply fluid to the housing of the float regulated valve $a$ is directed so as to pass through the nozzle or radial series of holes provided in the valve carrying plug as aforesaid, which nozzle or radial series of holes in combination with the float regulated valve permit of automatic control over the fluid in the passage provided in the valve housing into which the fluid discharges after passing through the nozzle and central cavity in the valve carrying plug, and this passage in the housing it will be understood is in communication with the under side of the balancing piston in the manner hereinbefore described, whereby the opening and closing of the feed check valve is controlled and the supply of feed water to the boiler is regulated.

It will be understood that the nozzle or radial series of holes provided in the valve carrying plug as aforesaid is always in communication with the port or passage through the housing through which the incoming supply fluid passes and that the radial port provided in a position opposite to the nozzle in the valve carrying plug is always in communication with the passage in the housing which communicates always with the underside of the balancing piston and with the inlet ports of the hollow cylindrical valve, it being understood that the arrangement is such that allowance is made for the movement of the valve carrying plug for varying the water level.

In the operation of the regulator it will be understood that when the fluid to be fed is subjected to pressure by the feed pump or injector, the pressure is applied between the check valve 1 and the balancing piston 3 so that the check valve remains closed. The fluid, however, can pass by way of the pipe 7 to the segmental recess $h^4$, thence by way of the radial holes to the central cavity $h^5$ in the valve carrying plug and thence by way of the radial hole $h^6$ to the passage $i^6$. In the case where the float is approximately at the desired water level the outlet ports $c$ of the valve will register with the corresponding outlet ports of the valve carrying plug so that the fluid may pass by way of the inlet ports and central cavity of the valve $a$ to the outlet ports and thence by way of the outlet passage $i^7$ to the outlet pipe 6 whence it may return to the source of supply. At the same time the fluid passing through the radial hole $h^6$ is free to pass by way of the pipe 5 to the underside of the piston 3 but in view of the outlet which is open through the outlet pipe 6, no pressure upon the under-side of the piston will be exerted by such fluid. When, however, the water level falls below that which is desired, the float correspondingly falls and causes the outlet ports of the valve $a$ to pass out of register with the outlet ports of the valve carrying plug. Consequently the outlet by way of the pipe 6 is closed and the full pressure of the fluid is transmitted by way of the pipe 5 to the under-side of the balancing piston 3. By reason of the pressure thus added the balancing piston lifts the check valve 1 and permits the feed to be effected. When the desired level has been recovered it will be understood that the outlet ports of the valve $a$ will re-open and the original conditions will be regained.

It will be observed that a portion of the liquid which is transmitted through the pipe 7 will pass in the first instance by way of the non-return valve 8 and the passage 9 to the float spindle 1 and thence pass by way of the duct $d^1$ into the float $e$.

The non-return valve 8 serves to prevent the transmission of the boiler pressure into the feed system in circumstances where the fluid feed is not under pressure.

The invention is applicable to any construction such as described in the specification of the co-pending application referred to.

We claim:

1. A feed water regulator comprising a feed check valve, a balancing piston controlling said check valve, a chamber within which said piston operates, means for transmitting a pressure medium to the said chamber to move said piston, a control valve for said pressure medium and a float operating the control valve and carried by the body of liquid to which the feed is effected, the said float being a hollow body adapted to be charged with liquid by way of a direct conduit from the feed supply and provided with a hole affording communication between the inside and the outside, substantially as described.

2. A feed water regulator comprising a feed check valve, a balancing piston controlling said check valve, a chamber within which said piston operates, means for transmitting a pressure medium to the said chamber to move said piston, a control valve for said pressure medium, a hollow float operating the control valve and carried by the body of liquid to which the feed is effected, a hollow float lever connected with said float and provided with a hollow axis, and means for supplying fluid through the said hollow axis and float lever to the float, substantially as described.

3. A feed water regulator comprising a feed check valve, a balancing piston controlling said check valve, a chamber within which said piston operates, a float operated valve controlling the movement of the said piston, a removable plug within which said valve is mounted, a housing adapted for the reception of the said plug, and means in said plug to permit the passage of pressure medium through the housing to the said piston, substantially as described.

4. A feed water regulator comprising a feed check valve, a balancing piston controlling said check valve, a chamber within which said piston operates, a float operated valve controlling the operation of the said piston, a plug within which said valve is mounted, a housing in which the said plug is rotatably and removably received, said plug serving by adjustment of its position to vary the water level, ports in the said plug permitting the transmission of pressure medium through passages in the said housing to the said piston, the said ports being in constant communication with the said passages at any angular position of the plug, substantially as described.

5. A feed water regulator comprising a feed check valve, a balancing piston controlling said check valve, a chamber within which said piston operates, a rotatable hollow cylindrical float operated valve for controlling the movement of the said piston, a plug within which said valve is mounted, a housing within which said plug is rotatably and removably received, a float casing, a hollow float spindle in said casing, said spindle carrying a hollow float by means of a hollow lever, means for coupling the said spindle with the said valve, passages within the said housing, ports within the said valve and valve carrying plug, and clearance spaces at the ends of the valve and the ends of the hollow float spindle, the said ports and passages co-operating for the transmission of pressure medium to and from the said piston and to the said clearance spaces for balancing the valve and the float spindle, substantially as described.

6. A feed water regulator comprising a feed check valve, a balancing piston controlling said check valve, a chamber within which said piston operates, a rotatable hollow cylindrical float operated valve controlling the movement of the said piston, pairs of diametrically disposed inlet and outlet ports of equal area in said valve, a plug within which said valve is mounted, said plug being provided with a central cavity at the upper end of the valve, an annular recess co-operating with the valve inlet ports, and outlet ports co-operating with the valve outlet ports and communicating with an annular recess, and ports leading to the said central cavity, a housing within which the said plug is removably and rotatably mounted, and passages in the said housing communicating with the ports and recesses of the said plug, substantially as described.

7. In a boiler feed water regulator of the class described, a float comprising a hollow body charged with liquid and provided with an opening, means for supplying the float with fluid through a duct formed in the float lever and through a communicating duct in the float spindle.

WILLIAM HENRY LOVETT.
ALBERT EDWIN DOBBS.